E. BAILEY.
CUT-OFF FOR HYDRANTS.
No. 36,319. Patented Aug. 26, 1862.
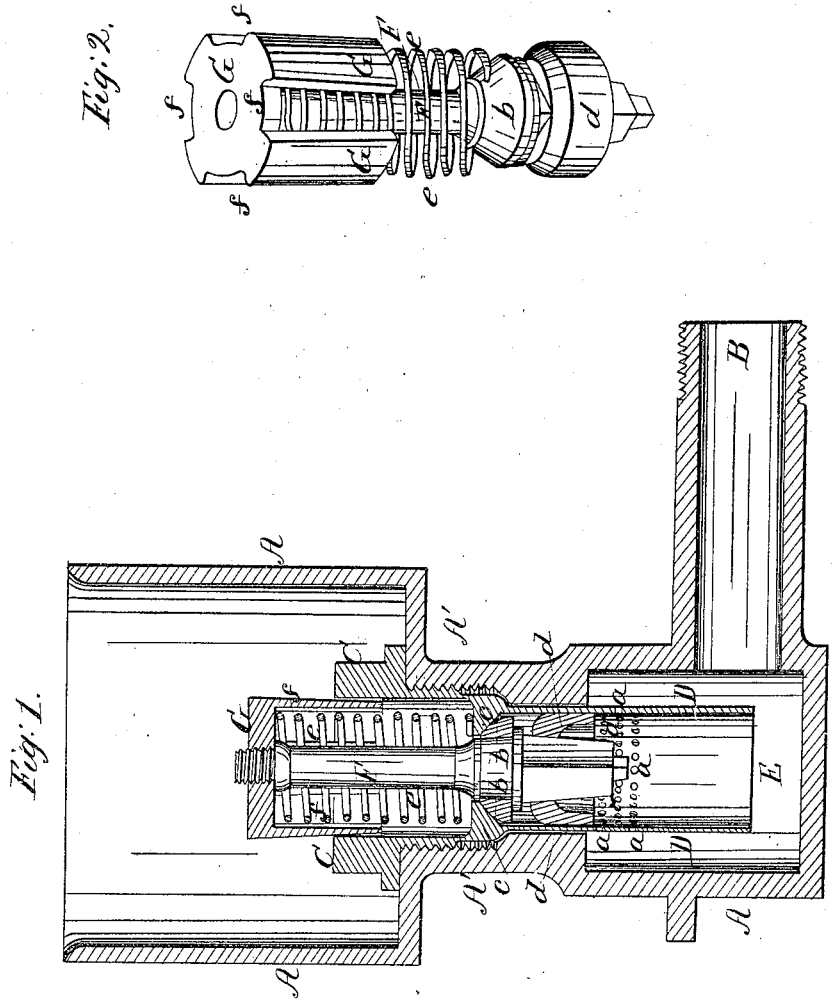
Witnesses;
Harry W. Price
A. B. Little
Inventor;
Edwin Bailey
By atty A. B. Houghton

UNITED STATES PATENT OFFICE.

EDWIN BAILEY, OF BALTIMORE, MARYLAND, ASSIGNOR TO HIMSELF AND HENRY McSHANE, OF SAME PLACE.

IMPROVEMENT IN CUT-OFFS FOR HYDRANTS.

Specification forming part of Letters Patent No. 36,319, dated August 26, 1862.

*To all whom it may concern:*

Be it known that I, EDWIN BAILEY, of the city and county of Baltimore, and State of Maryland, have invented a certain new and useful Improvement in Spring Cut-Offs for Hydrants; and I do hereby declare the following to be a full, clear, and exact description of the construction and operation of the same, reference being had to the accompanying drawings, making a part of this specification, in which—

Figure 1 represents a vertical section through the lower end of a hydrant, showing my cut-off applied thereto. Fig. 2 represents a perspective view of the plug detached from its place in the hydrant.

In drawing water from pipes that have a "high head" or heavy pressure upon them the sudden closing of a cock so jars the pipes as to frequently break them or open their joints.

The object of my invention is, by a simple appliance to the plug or cock, to stop this sudden reaction of the water in the pipes, and thus avoid the danger of bursting or breaking the pipes, and this I effectually do by cutting off the flow or column of water gradually instead of suddenly, as must invariably be done when a spring returns the plug to its seat; and my invention consists in combining with a plug-case having a series of openings through it for the water to pass through a cut-off on the valve or plug stem that gradually, by the recoil of the valve-spring, closes said openings, and thus gradually cutting off the flow of water without jar or sudden cessation, and thus avoiding the breaking of the water-pipes.

To enable others skilled in the art to make and use my invention, I will proceed to describe the same with reference to the drawings.

A represents the lower portion of a hydrant, and B the pipe by which it is connected to a water-pipe.

C is a plug-case screwed into the part A at its contracted portion A'. To this plug-case C is connected a pipe or tube, D, extending down into the chamber E, said pipe or tube being furnished with a series of holes, $a$ $a$, &c. To this plug-case and pipe or tube are fitted a plug or stop, $b$, that comes up against a seat, $c$, and a cut-off, $d$, that moves past the openings or holes $a$, to admit and cut off the inflow or throughflow of water. The stop $b$ and the cut-off $d$ are both attached to the valve stem or rod F, which is screwed into a cross-head or guide-piece, G, which is furnished with suitable openings, $f$, to allow the water to pass through when the valve is open, and the cut-off below the holes $a$.

The valve-stem, and consequently its valve $b$ and cut-off $d$, are raised by the action of a spring, $e$, interposed between the head G and the plug-case C, as shown in the drawings.

The operation of this hydrant is as follows: The valve-stem and its valve and cut-off being forced downward by any of the usual appliances for such a purpose until the cut-off $d$ passes below the holes or perforations $a$ in the tube or pipe D, the water will enter through the openings $a$ and through or past the valve $b$, and thence through the openings $f$ to the outflow-pipe of the hydrant. By letting go or releasing the lever or handle by which the valve and cut-off were pressed down the spring $e$ by its recoil moves up both the cut-off and the valve, and the moment the cut-off begins to rise it commences to gradually close the openings $a$, and thus continues to gradually close and hold closed said openings until it has passed the whole series, at which time the valve $b$ has arrived at its seat $c$, and the column of water is entirely shut off. The cutting off of the flow of water in this way causes no jar, no reaction, and no pulsations, as in a water-ram, and there is no breaking of pipes.

To prevent the hydrant from freezing, the usual appliance for allowing the water in the pipe to run back into the cup is used. As this is common to other hydrants, I have not deemed it necessary to represent it here. My hydrant has all the properties of other hydrants, with the addition of a spring cut-off, which prevents all jar and breaking of pipes.

Having thus fully described my invention, what I claim in connection with hydrants is—

The combination of the spring cut-off $d$ with the series of openings or perforations $a$, for the purpose of gradually shutting off the throughflow of water to prevent jarring and breaking of pipes, substantially as described.

EDWIN BAILEY.

Witnesses:
GEORGE WEYFORTH,
HANSON KEYS.